United States Patent

[11] 3,634,657

[72] Inventors Louis M. Ballard;
  Waldo I. Rogers, both of Arcadia, Calif.
[21] Appl. No. 842,190
[22] Filed July 16, 1969
[45] Patented Jan. 11, 1972
[73] Assignee Rusco Industries, Inc.
  Los Angeles, Calif.

[54] ELECTRONIC READER MEANS FOR MAGNETIC CREDIT CARDS AND THE LIKE
  7 Claims, 10 Drawing Figs.

[52] U.S. Cl. .................................................. 235/61.11 D, 307/309
[51] Int. Cl. .................................................. G06k 7/08, H03k 1/00
[50] Field of Search .......................................... 235/61.11, 61.114; 340/174.1 F, 174.1 H; 307/309; 310/8.6

[56] References Cited
  UNITED STATES PATENTS
  2,866,013  12/1958  Reis .............................. 340/174.1 F
  3,453,598  7/1969  Schweizer ...................... 235/61.11 X
  3,471,862  10/1969  Barney ............................ 235/61.11 D Primary Examiner—Daryl W. Cook
Attorney—Perry E. Turner ABSTRACT: A nonconductive substrate supports resistive elements with a plurality of parallel current paths, and a magnetic card is adapted to be positioned with a plurality of magnet portions thereof aligned with said elements. The resistive elements may be respective elements or different parts of a strip of resistive material. Embodiments are shown in which the elements are connected to a DC voltage source, and a respective DC amplifier is coupled to each element to develop a positive or negative output voltage depending upon the polarity of the end of the card magnet portion adjacent the element. In another embodiment, the elements are connected to an AC reference voltage source, and a respective AC amplifier is coupled to each element to develop an output that is in phase or out of phase with the reference voltage depending upon the polarity of the end of the card magnet portion adjacent the element. In the latter embodiment, phase detectors coupled to the AC amplifiers develop positive or negative outputs depending upon the phase relations of the amplifier outputs to the AC reference voltage.

INVENTORS
LOUIS M. BALLARD
WALDO I. ROGERS
BY
*Perry E. Turner*
ATTORNEY

INVENTORS
LOUIS M. BALLARD
WALDO I. ROGERS
BY
Perry E. Turner
ATTORNEY 3,634,657

ELECTRONIC READER MEANS FOR MAGNETIC CREDIT CARDS AND THE LIKE

BACKGROUND OF THE INVENTION

1. Field of the Invention

This invention relates to static magnetic card reader apparatus.

2. Description of the Prior Art

Magnetic card reader apparatus as heretofore known employ movable switch elements to be operated by magnetized portions of a credit card. Switches for this purpose employ movable magnet contacts to make and break connection between pairs of fixed contacts. Such switches are typically mounted in openings in a plate adjacent one surface thereof. A card with a plurality of magnet portions is placed against such surface so that the magnet portions are aligned with respective switches. The polarity orientations of the card magnet portions and the magnet contacts are such as to cause movement of a predetermined number of magnet contacts to close their associated switches and effect a visual indication by a network to which the switches are connected.

The prior art includes such switches wherein the magnet contacts are slidable, and switches wherein the magnet contacts are pivotally mounted. Such movable contacts require considerable care in assembly to prevent contamination thereof, to orient them properly, and to minimize friction. Quite small switches are required where dozens of them are needed in a small space, and the attendant problems of assembly of such small parts militate against high volume production at minimum cost.

SUMMARY OF THE INVENTION

This invention embraces, for magnetic cards in which information is recorded in the distribution of a plurality of magnet portions poled along lines perpendicular to the faces thereof, means supporting a card and a plurality of resistive elements so that card magnet portions are aligned with respective elements, and network means for establishing current flow through said elements and developing voltage outputs at right angles to the direction of current flow of signs representing the polarities of the ends of the card magnet portions aligned with the elements. This invention also embraces means responsive to said outputs to develop signals identifiable with the card.

In addition to eliminating switches with movable magnet contacts, our invention permits the use of elements that are markedly more sensitive and responsive to the presence of a magnet pole than switches with moving parts. Further, because of such sensitivity and responsivity, such elements permit the use of cards having much smaller and more closely packed magnet portions than has heretofore been possible. Still further, such devices lend themselves to mass production at minimum cost.

DESCRIPTION OF ILLUSTRATIVE EMBODIMENTS

Figure 1:
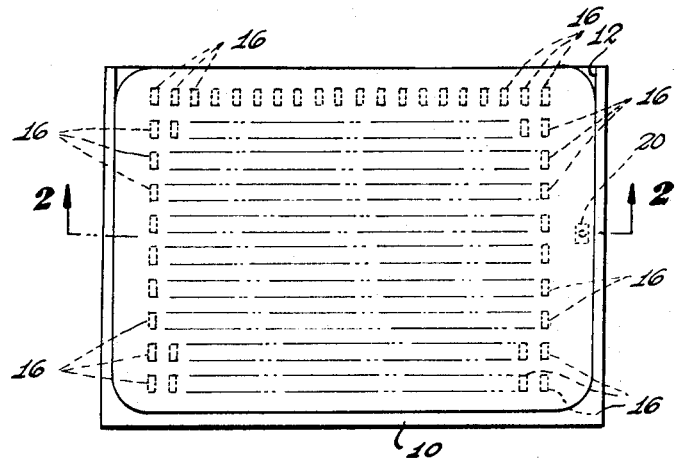
FIG. 1 is a top plan view of a magnetic card overlaying a plurality of resistive elements.
Figure 2:
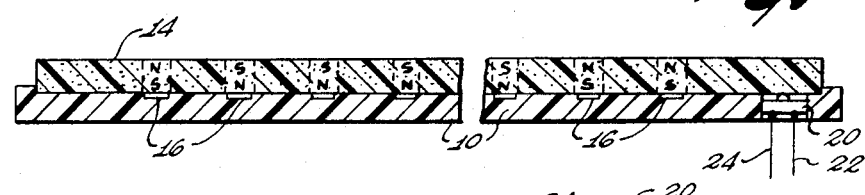
FIG. 2 is a fragmentary, longitudinal sectional view taken along the line 2—2 of FIG. 1.

Referring to FIGS. 1 and 2, a nonmagnetic baseplate 10 is shown having a groove 12 in its upper surface to slidably receive a magnetic card 14. Deposited on the upper surface of the baseplate 10 are a plurality of resistance elements 16, which are arranged in a plurality of rows and columns.

The card 14 is shown as a homogeneous sheet in which magnetic material is distributed throughout a plasticlike base. Such a card is characterized as one which can be selectively magnetized along lines perpendicular to the card faces, to provide a plurality of permanent magnet portions wherein the polarities of the ends thereof adjacent the top surface of the baseplate 10 are distributed in accordance with a predetermined pattern. The cards may be coded by having differently positioned magnet portions poled in reverse to their polarity orientations in a master pattern. The positions of such card magnet portions are such that when the card is in place in the groove 12, each card magnet portion is aligned with a respective element 16.

Figure 3:
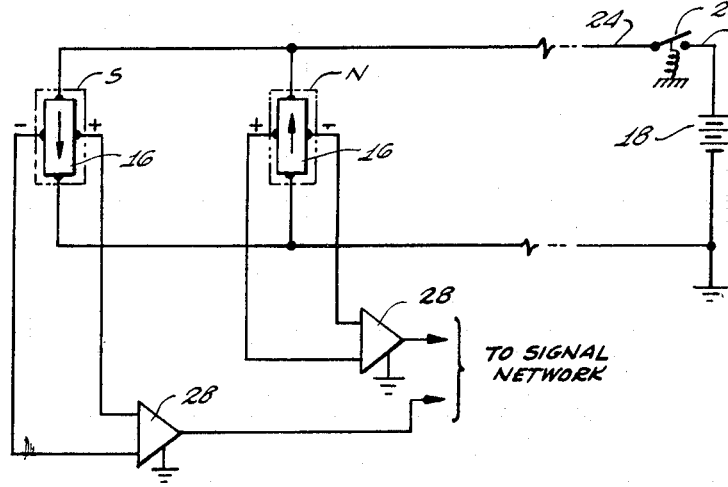
FIG. 3 is a schematic diagram illustrating circuit means for connecting the ends of the elements to a DC voltage source, and DC amplifier means for developing an amplified version of the voltage generated across the widths of such elements.

Referring to FIG. 3 along with FIGS. 1 and 2, each device 16 is adapted for connection to a DC voltage source 18. In the arrangement shown, leads from the ends of the elements 16 are connected in parallel, with one lead from each element being connected to the negative terminal of the source 18, and with the remaining leads adapted to be connected to the positive terminal of the source through a normally open switch 20. The switch 20 is shown secured in the baseplate 10, with its plunger adapted to be depressed by the card 14 when it is placed in the groove 12. Leads 22, 24 from the switch terminals are connected to the positive terminal of the source 18 and to said remaining leads from the elements 16.

Our invention utilizes the Hall effect. In this connection, each element 16 is characterized in that during current flow through it from the source, as illustrated by the arrows in FIG. 3, a potential is established across it in a direction at right angles to the current flow when a pole of a magnet is placed in proximity to the element. Further, the potential developed across such an element in the presence of a south pole is the reverse of that developed across it in the presence of a north pole. For the two devices illustrated in FIG. 3, the south pole of a card magnet portion is shown in phantom to be positioned over the device on the left, for which the potential at the right edge of the element is positive, and the north pole of a card magnet portion is shown positioned over the device on the right, for which the potential at the left edge of the element is positive. Any suitable material with which a Hall effect can be detected may be employed for the resistive elements, and may include resistive films of germanium, silicon or the like.

Figure 4A:
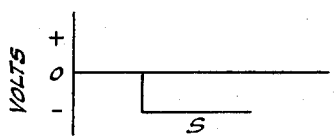
FIGS. 4a and 4b illustrate waveforms of voltages developed by the amplifiers in FIG. 3.
Figure 4B:
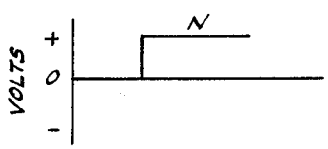

Leads from the edges of the devices 16 along such lines are shown connected to respective DC amplifiers 28 for amplifying the small developed voltages to a desired level. In this connection, FIG. 4a illustrates the DC output voltage as a negative voltage resulting from the south pole of a card magnet portion being brought into proximity to an element 16. FIG. 4b illustrates such voltage as a positive voltage resulting from the north pole of a card magnet portion placed next to such an element.

Figure 5:
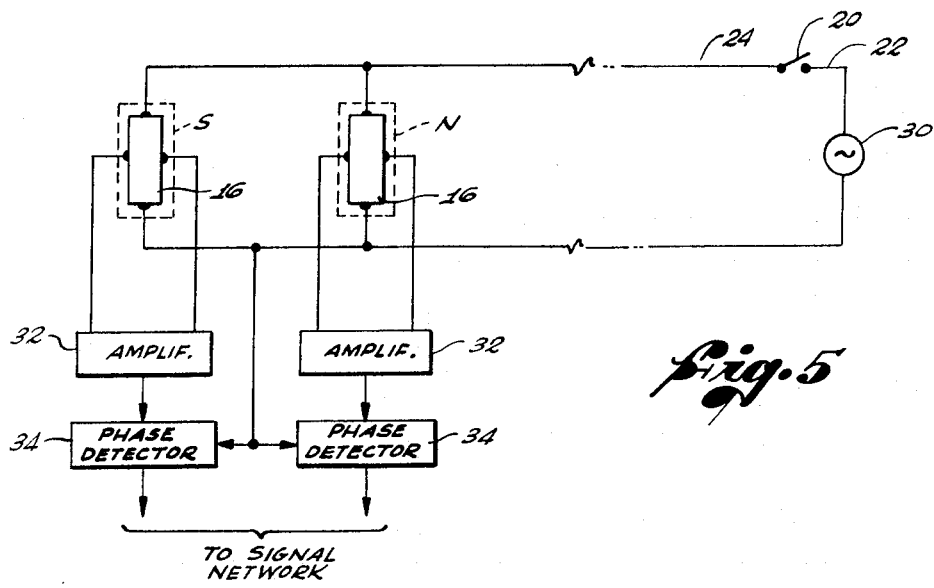
FIG. 5 is a schematic diagram of illustrative circuitry for applying an AC reference voltage to the elements, with AC amplifiers for developing amplified versions of alternating voltages developed across the elements, and phase detectors for providing DC outputs representing the phase relations of the amplifier output voltages with respect to the AC reference voltage.

FIG. 5 illustrates a similar arrangement in which the potential applied across the ends of the elements 16 is an AC reference voltage from a source 30. In such an arrangement, the pole of a card magnet portion placed next to an element 16 causes an alternating potential to be developed across its edges. Further, the alternating voltage thus developed in the presence of a south pole is opposite in phase to that developed in the presence of a north pole. In both cases, of course, the developed AC voltages are of the same frequency as the reference voltage.

Figure 6A:
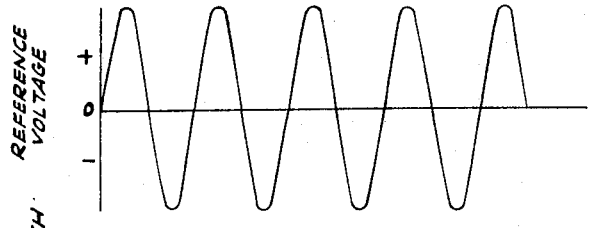
FIGS. 6a, 6b and 6c illustrate, respectively, the AC reference voltage applied to the elements of FIG. 5, and the voltage waveforms of the amplifier outputs.
Figure 6B:
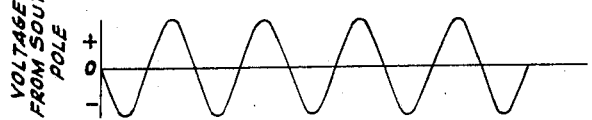
Figure 6C:
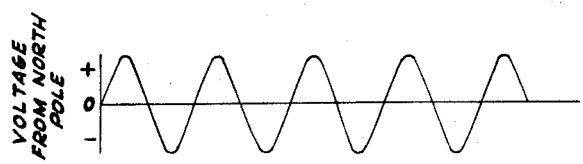

To aid in understanding the above-described operations, the AC voltage developed in the presence of a south pole of the card magnet portion will be considered to be out of phase with the reference voltage, and the voltage developed in the presence of a north pole of a card magnet portion will be considered to be in phase with the reference voltage. Thus, FIG. 6a illustrates the reference voltage; FIG. 6b illustrates the voltage developed across the element 16 shown on the left in FIG. 5, which voltage is shown to be out of phase with that in FIG. 6a; and FIG. 6c illustrates the voltage developed across the element 16 on the right in FIG. 5, such voltage being shown to be in phase with that in FIG. 6a.

As in the preceding example, the developed voltages are quite small in magnitude and require amplification, for which AC amplifiers 32 are connected to the devices 16. Rectification of the outputs of amplifiers 32 would, of course, result in voltages of the same magnitude and sense, and would not reflect the fact that voltages developed in the presence of magnet poles of opposite polarity or of opposite phase. Phase-sensing means are accordingly provided, and to this end the AC reference voltage is applied to phase detectors 34 to which the outputs of the amplifiers 32 are connected. Thus, phase detectors for voltages generated across elements 16 in the presence of north poles of card magnet portions provide DC output voltages of one sign, e.g., positive, and phase detectors for voltages generated across elements 16 in the presence of south poles of card magnet portions develop negative output voltages.

Figure 7:
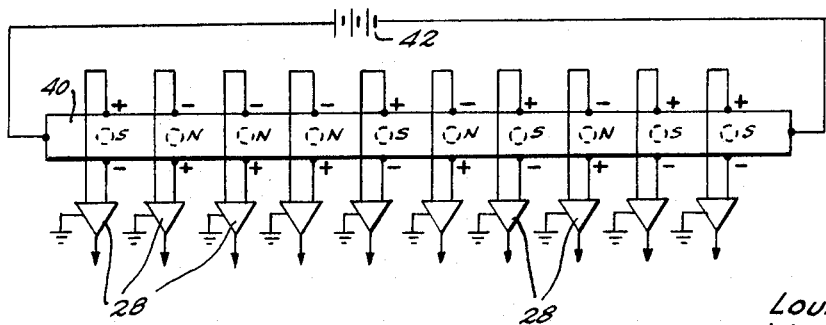
FIG. 7 is a schematic diagram of a resistor strip connected at its ends to a DC source and showing respective DC amplifiers coupled across spaced portions of the strip for developing amplified versions of the DC voltages developed across such portions.

FIG. 7 is a schematic illustration of another embodiment of our invention, wherein the ends of a resistor strip 40, are connected to the terminals of a voltage source, shown as a battery 42. Spaced pairs of leads across the edges of the strip 40 are connected to respective DC amplifier 28. The strip 40 may be a film of resistance material deposited upon a nonconductive substrate, and the portions between the leads at the edges of the film function as the elements 16 previously described. With this arrangement, the poles of card magnet portions placed adjacent portions of the strip 40 between the pairs of leads cause DC potentials to be developed across their edges, the directions of such potentials depending upon the polarities of such poles of the card magnet portions.

It should be noted that printed circuit techniques may be employed for the leads to the ends and edges of the elements 16 and to the edges of the strip 40. For the elements 16, four leads for each may extend through holes in the plate 10 to the upper surface of the plate, so that the element deposited on such upper surface is deposited on the upper ends of the leads. The spaced pairs of leads along the strip may include conductors deposited on the same surface as the resistor film. As will be apparent, such structures can be produced in high volume at low cost.

Our invention also permits a greater number of card magnet portions to be packed in a given space than has heretofore been possible. In prior reading apparatus using magnet-responsive switches with moving parts, the needed physical sizes of the switches determines and limits the number and spacing of card magnet portions. In our invention, useable Hall effect potentials are developed with substantially smaller resistive elements in the presence of substantially smaller card magnet portions. In one example elements 0.05 in. × 0.10 in. are arranged in 10 rows of 20 elements each at a surface within an area 2 in. × 1.5 in., which is smaller than that of a standard credit card. The magnetic cards may have magnet portions of 0.05 in. diameter spaced to be centered over the elements, as when the card is positioned in the manner shown in FIG. 1.

In this example, the magnetic credit cards have 200 magnet portions, which permits many hundreds of thousands of different codes, with one code for each card, to be in the card. Many millions of codes are possible, of course, with smaller and more closely spaced magnet portions to be aligned with more closely spaced resistive elements that are smaller than in such example.

Further, it will be noted that each Hall effect circuit herein is a three-state circuit—a neutral state and two states in which outputs of opposite sign or phase are developed in the presence of magnet poles of opposite polarity. These states permit the use of magnetic card and reader apparatus wherein card codes are composed of magnetized and unmagnetized portions, and wherein the network develops signals representing the data recorded in the card in terms of logic represented by magnetized and unmagnetized card portions. A still greater number of card codes is thus possible than can be realized with switches with movable magnet contacts, which are two-state devices.

Our invention also embraces networks wherein the card portions are scanned. For example, electronic switching means may be coupled between the voltage source and the elements 16, and operative to sequentially connect the source to the elements and to develop and process signals reflecting the states of the circuits thus scanned. Also, if desired, networks as disclosed herein may include printout means and means to operate lamps to provide visual information concerning a card and the owner thereof. In security systems, the networks may be adapted to operate doors, turnstiles and the like in response to a validly coded card.

We claim:

1. A housing having a slot to receive and hold stationary a card having a plurality of magnet portions poled along lines at right angles to the card faces, the ends of the magnet portions at the card faces having a predetermined polarity distribution;
   a stationary nonconductive element having a flat surface parallel to and at one side of said slot;
   resistance means on said surface said resistance means having a plurality of portions positioned to be confronted by respective poles of magnet portions of a card placed in the slot;
   means for connecting said resistance means to an external current source to establish a current path through said resistance means at each portion thereof, said resistance means being characterized in that at each said portion thereof a potential of predetermined magnitude is developed between points on either side of the current path in the presence of a pole of a card magnet portion aligned therewith, and in that the potential between such points in the presence of a south pole is opposite to that in the presence of a north pole;
   and a network means responsive to the potentials to develop signal information identifiable with the card.

2. The combination of claim 1, including means to connect said resistance means to the external current source to establish current paths through said portions thereof in a predetermined sequence.

3. The combination of claim 1, wherein said resistance means includes a plurality of resistance elements connected in parallel;
   and switch means for connecting said parallel-connected resistance elements to an external current source;
   and a pair of connections to said network means from points on each resistance element along a line at right angles to the current path through it.

4. The combination of claim 1, wherein said resistance means includes a plurality of resistance elements connected in series for connection across an external current source;
   and a pair of connections to said network means from points on each resistance element along a line at right angles to the current path through it.

5. The combination of claim 1, wherein said resistance means includes a strip of resistance material of such length that a plurality of magnet portions of a card in said slot are aligned with spaced portions thereof;
   and pairs of connections to said network means from the edges of said spaced portions of said strip.

6. The combination of claim 1, including a DC source for the external current source;
and wherein said network means includes a respective DC amplifier for the potential developed at each portion of said resistance means.

7. The combination of claim 1, including an AC reference voltage source for the external current source, and wherein said network means includes means for developing a respective DC voltage representing the phase relation of such potential with respect to the AC reference voltage.

* * * * *